US005846643A

United States Patent [19]

Badesha et al.

[11] Patent Number: 5,846,643

[45] Date of Patent: Dec. 8, 1998

[54] THERMALLY STABLE FUSER MEMBER

[75] Inventors: Santokh S. Badesha; Arnold W. Henry; Robert J. Gruber, all of Pittsford, N.Y.

[73] Assignee: Xerox Corporation, Stamford, Conn.

[21] Appl. No.: 556,556

[22] Filed: Nov. 13, 1995

[51] Int. Cl.[6] .......................... B32B 05/16; G03G 15/20

[52] U.S. Cl. .......................... 428/323; 428/324; 428/332; 428/421; 428/447; 428/448; 428/450; 428/457; 428/35.8; 428/36.9; 492/53; 492/56; 399/320; 399/330; 523/209; 523/212

[58] Field of Search .......................... 428/324, 323, 428/332, 421, 447, 448, 450, 457, 35.8, 36.9; 492/53, 56; 399/320, 330, 351; 523/200, 205, 209, 212; 524/449, 447

[56] References Cited

U.S. PATENT DOCUMENTS

| | | | |
|---|---|---|---|
| 4,244,911 | 1/1981 | Ishizaka et al. | 264/331 |
| 4,684,238 | 8/1987 | Till et al. | 355/10 |
| 4,763,158 | 8/1988 | Schlueter, Jr. | 355/3 FU |
| 4,777,087 | 10/1988 | Heeks et al. | 428/321.1 |
| 5,032,547 | 7/1991 | Giannelis et al. | 501/3 |
| 5,310,775 | 5/1994 | Sibilia et al. | 524/398 |
| 5,337,129 | 8/1994 | Badesha | 355/275 |
| 5,361,126 | 11/1994 | Loonen et al. | 355/279 |
| 5,414,042 | 5/1995 | Yasue et al. | 524/789 |
| 5,514,734 | 5/1996 | Maxfield et al. | 523/204 |
| 5,552,469 | 9/1996 | Beall et al. | 524/445 |
| 5,578,672 | 11/1996 | Beall et al. | 524/446 |

FOREIGN PATENT DOCUMENTS

| | | |
|---|---|---|
| 57-4055 | 1/1982 | Japan . |
| 62-68788 | 3/1987 | Japan . |

OTHER PUBLICATIONS

S. Burnside & E. Giannelis, "Synthesis and Properties of New Poly(Dimethylsiloxane) Nanocomposites," Chemistry of Materials, vol. 7, No. 9, pp. 1597–1600 (Sep. 1995).

S. Burnside & E. Giannelis, "Synthesis, Characterization, and Properties of Siloxane Nanocomposites," a set of 15 slides presented at the American Chemical Society Northeastern Regional meeting in Rochester, NY, Oct. 12, 1995.

E. Giannelis, "Polymer matrix nanocomposites," a set of 18 slides presented at the American Chemical Society Northeastern Regional Meeting in Rochester, NY, Oct. 25, 1995.

Derwent accession No. 95–182640/24 for Japanese Patent No. 7–101086, Matsushita Denki Sangyo KK., Apr. 1995 (abstract only).

*Primary Examiner*—Marie R. Yamnitzky
*Attorney, Agent, or Firm*—Zosan S. Soong

[57] ABSTRACT

A fuser member for use in an electrostatographic printing machine has at least one layer of an elastomer composition comprising a silicone elastomer and a mica-type layered silicate, the silicone elastomer and mica-type layered silicate forming a delaminated nanocomposite with silicone elastomer inserted among the delaminated layers of the mica-type layered silicate.

12 Claims, 4 Drawing Sheets

THERMALLY STABLE FUSER MEMBER

Attention is hereby directed to Application Ser. No. 08/556,554 (now abandoned) titled "INTERMEDIATE TONER TRANSFER MEMBER" having the inventors, Santokh S. Badesha, Arnold W. Henry, and Robert J. Gruber, which is filed concurrently with the present application. A continuation-in-part application, U.S. Ser. No. 08/870,742, of parent application U.S. Ser. No. 08/556,554 was filed on Jun. 6, 1997.

CROSS REFERENCE TO RELATED APPLICATIONS

BACKGROUND OF THE INVENTION

The present invention relates to a silicone elastomeric fuser member for use in electrostatographic printing apparatus. In particular, it relates to silicone elastomers that are thermally stable and swell resistant.

In electrostatographic reproducing apparatus commonly used today a photoconductive insulating member is typically charged to a uniform potential and thereafter exposed to a light image of an original document to be reproduced. The exposure discharges the photoconductive insulating surface in exposed or background areas and creates an electrostatic latent image on the member which corresponds to the image contained within the original document. Alternatively, a light beam may be modulated and used to selectively discharge portions of the charged photoconductive surface to record the desired information thereon. Typically, such a system employs a laser beam. Subsequently, the electrostatic latent image on the photoconductive surface is made visible by developing the image with developer powder referred to in the art as toner. Most development systems employ developer which comprised both charged carrier particles and charged toner particles which triboelectrically adhere to the carrier particles. During development the toner particles are attracted from the carrier particles by the charged pattern of the image areas of the photoconductive insulating area to form a powder image on the photoconductive area. The toner image may be subsequently transferred to a support surface such as copy paper to which it may be permanently affixed by heating or by the application of pressure. The present invention relates to the fusing of the toner image on a support.

The use of thermal energy for fixing toner onto a support member is well known. In order to fuse electroscopic toner material onto a support surface permanently by heat, it is necessary to elevate the temperature of the toner material to a point at which the constituents of the toner material coalesce and become tacky. This heating causes the toner to flow to some extent into the fibers or pores of the support member. Thereafter, as the toner material cools, solidification of the toner material causes the toner material to be firmly bonded to the support.

Several approaches to thermal fusing of electroscopic toner images have been described in the prior art. These methods include providing the application of heat and pressure substantially concurrently by various means: a roll pair maintained in pressure contact; a flat or curved plate member in pressure contact with a roll; a belt member in pressure contact with a roll; and the like. During operation of the fusing system of the two rolls, the support member to which toner images are electrostatically adhered is moved through the nip formed between the rolls with the toner image contacting the fuser roll thereby to effect heating of the toner images within the nip. Typical of such fusing devices are two roll systems wherein the fusing roll is coated with an adhesive material, such as silicone rubber or other low surface energy elastomer as, for example, tetrafluoroethylene resin sold by E. I. DuPont de Nemours under the trade name of Teflon. The silicone rubber which can be used as the surface of the fuser member can be classified into several groups according to the vulcanization method and temperature, i.e., room temperature vulcanization silicone rubber hereinafter referred to as RTV silicone rubber, and high temperature vulcanization type silicone rubber, referred to as HTV rubber. All these silicone rubbers or elastomers are well known in the art and are commercially available.

It is important in the fusing process that no offset of the toner particles from the toner image support to the fuser member takes place during normal operations. The so called "hot offset" occurs when the temperature of the toner is raised to a point where the toner particles liquify and a splitting of the molten toner takes place during the fusing operation with a portion remaining on the fuser member. The degradation of the hot offset temperature is a measure of the release property of the fuser roll, and accordingly it is desired to provide a fusing surface which has a low surface energy to provide the necessary release. While many materials may initially function with good release properties with continued use, they tend to be contaminated with paper fibers, debris and toner as a result of hot offset of toner, thereby increasing the surface energy of the roll and perpetuating the destruction of release performance. Once the roll becomes contaminated the hot offset temperature starts to reduce and may reach a level near or below the minimum temperature necessary to fuse the toner to the fuser roll.

Toner release agents such as silicone oil, in particular polydimethyl silicone oil is applied on the fuser roll to a thickness of about 1 micron to act as a toner release material. These materials possess a relatively low surface energy and are suitable for use in the heated fuser roll environment. In practice, a thin layer of silicone oil is applied to the surface of the heated roll to form an interface between the roll surface and the toner image carried on the support material. Thus, a low surface energy, easily parted layer is presented to the toners that pass through the fuse nip and thereby prevents toner from offsetting to the fuser roll surface. Further information concerning the fusing process may be found in U.S. Pat. No. 4,763,158 to Schlueter which is hereby totally incorporated by reference.

Fuser members such as fuser rolls may take several different forms such as those wherein a metallic cylindrical sleeve such as aluminum is heated by a heating element disposed in the center of the aluminum sleeve which is covered by an intermediate layer of a silicone elastomer and a relatively thin fusing layer of a hydrofluoroelastomer such as an FKM elastomer. This configuration of a fuser member while capable of performing satisfactorily does exhibit a hardening of the silicone elastomer in the intermediate layer and a consequent degradation in life and performance. This hardening occurs because the silicone elastomer lacks sufficient thermal stability to maintain its physical properties over time at elevated temperatures such as the fusing temperature and beyond. In particular, it is believed that the silicone elastomer hardens because of thermal oxidative crosslinking of the silicone elastomer by oxygen reacting with methyl groups along the silicone chain, which in addition to leading to oxidative degradation by the application of heat in the presence of oxygen also liberates undesirable amounts of formaldehyde. The attack by oxygen is believed to create free radicals which by further reaction eventually results in a silicon-oxygen-silicon crosslink. This additional crosslink with oxygen as a bridge in the crosslinking network with the methyl groups of the elastomer stiffen the elastomeric network resulting in hardening of the silicone elastomer which thereafter becomes brittle and loses its toughness and conformance, shows more wear, reduces its elongation and fatigue life, and results in a higher modulus. In addition, the interfacial bonding between the silicone elastomer and the hydrofluoroelastomer deteriorates, adding to performance difficulties. As a result of this thermal instability and consequent hardening, a smaller fuser nip between the fuser roll and the pressure roll may occur resulting in reduced dwell time within the fuser nip, and, therefore, poorer fix of the toner to the paper which in turn may lead to paper handling difficulties. Furthermore, since the harder fuser roll does not conform as well to the pressure roll, the level of gloss in the final fused copy may be reduced which is a particularly negative aspect for color printing.

In an alternative embodiment of a fuser member and typically a roll, the fusing surface is actually made from the silicone elastomer which may indeed be a thin surface coating on a thicker silicone elastomer layer on a heated aluminum core. When using such a silicone elastomer fusing surface, a silicone oil release agent is typically delivered to the fuser oil by a silicone elastomer donor roll. For further discussion of the elastomers and the silicone oil release agents, attention is directed to U.S. Pat. No. 4,777,087 to Hicks et al. These systems and in particular, the combination of the silicone elastomer fuser roll and the silicone oil release agent are highly successful in providing a fusing surface with a low surface energy to provide excellent release properties to ensure that the toner is completely released from the fuser roll during the fusing operation. These systems however may suffer from a significant deterioration in physical properties over time in a fusing environment. In particular, the silicone oil release agent tends to penetrate the surface of the silicone elastomer fusing members resulting in swelling of the body of the elastomer, causing major mechanical failure including debonding of the elastomer from the substrate, softening, and reduced toughness of the elastomer causing it to chunk out and crumble, contaminating the machine and providing non-uniform delivery of release agent to the print substrate.

It is accordingly desirable to provide a silicone elastomer composition for use in a fusing member whether it be a fusing surface layer or an intermediate support layer in a fuser member for an electrostatographic printing apparatus.

The following three documents relate to nanocomposites, the disclosures of said three documents being totally incorporated herein by reference:

Shelly D. Burnside and Emmanuel P. Giannelis, "Synthesis and Properties of New Poly(Dimethylsiloxane) Nanocomposites," CHEMISTRY OF MATERIALS, vol. b 7, no. 9, pp. 1597–1600 (September 1995);

A set of fifteen slides (including the cover page) titled "Synthesis, Characterization, and Properties of Siloxane Nanocomposites," presented by Shelly D. Burnside and Emmanuel P. Giannelis at the American Chemical Society Northeastern Regional Meeting in Rochester, New York on Oct. 23, 1995; and A set of eighteen slides (including the cover page) titled "Polymer Matrix Nanocomposites," presented by Emmanuel P. Giannelis at the American Chemical Society Northeastern Regional Meeting in Rochester, N.Y. Oct. 25, 1995.

SUMMARY OF THE INVENTION

In accordance with a principle aspect of the present invention, a thermally stable, swell resistant, fuser member for use in an electrostatographic printing apparatus comprising at least one layer of an elastomer composition including a silicone elastomer and a mica-type layered silicate, said silicone elastomer and mica-type layered silicate forming a delaminated nanocomposite with silicone elastomer inserted among the delaminated layers of the mica-type layered silicate.

In a further aspect of the present invention, the mica-type layered silicate has a high aspect ratio structure.

In a further aspect of the present invention, the silicone elastomer is cured from a polyorganosiloxane having the formula:

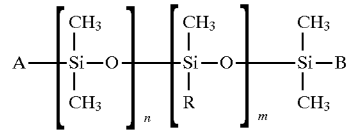

where R is hydrogen or substituted or unsubstituted alkyl, alkenyl or aryl having less than 19 carbon atoms, each of A and B may be any of methyl, hydroxy or vinyl groups and $$0<m/n<1 \text{ and } m+n>350.$$

In a further aspect of the present invention, the mica-type layered silicate has a particle size having a maximum length of from about 1 micrometer to about 10 micrometers.

In a further aspect of the present invention at least one layer of the fuser member is a surface layer of from about 10 mils to about 100 mils in thickness.

In a further aspect of the present invention the at least one layer of the fuser member is an intermediate layer of from about 50 mils to about 100 mils in thickness.

In a further aspect of the present invention, the fuser member is a cylindrical roll which is internally heated by a heating element disposed in the center and the surface layer is a heated toner fusing surface layer.

In a further aspect of the present invention, the toner fusing surface layer is an FKM hydrofluoroelastomer layer from about 1 to about 5 mils in thickness and there is an intermediate silicone elastomer composition from about 50 mils to about 100 mils in thickness.

There is also provided a method of making a thermally stable, swell resistant fuser member comprising at least one layer of an elastomer composition comprising a silicone elastomer filled with a mica-type layered silicate forming a delaminated nanocomposite with the silicone elastomer intercalated among the delaminated layers of the mica-type layered silicate comprising mixing with mechanical shear a polyorganosiloxane with a mica-type layered silicate to delaminate the layers of the mica-type layered silicate and to intercalate the polyorganosiloxane among the delaminated layers of the mica-type layered silicate, adding with mechanical shear to said polyorganosiloxane intercalated delaminated layers an amount of a crosslinking agent and a catalyst sufficient to crosslink said polyorganosiloxane to a silicone elastomer, shaping the silicone elastomer intercalated delaminated nanocomposite and curing the shaped silicone elastomer intercalated delaminated nanocomposite to form said at least one layer of the fuser member.

BRIEF DESCRIPTION OF THE DRAWINGS

In FIG. 1 a relatively thin silicone fusing surface is illustrated and in FIG. 2 a relatively thick silicone intermediate layer is illustrated.

Unless otherwise noted, the same reference numeral in the Figures refers to the same or similar feature.

DETAILED DESCRIPTION OF THE INVENTION

To facilitate a greater understanding of the present invention, the following terms shall be interpreted to have the following meanings. Thermal stability shall refer to the ability of an elastomer to maintain its physical properties over time at one or more elevated temperatures and is expressed as a ratio of a property value at a particular time and temperature over the property value at time $T_0$ and room temperature. In particular, it refers to stability of physical properties at fusing temperature and beyond in an electrostatographic printing apparatus. The lesser the reduction in the property over time at $T_1$, $T_2$, or $T_3$ the greater the thermal stability. The term mica-type layered silicate (referred herein as "MTS") shall mean a leaf or sheet like laminated phyllosilicate mineral, typically natural or synthetic complex hydrous silicates based on aluminum, magnesium, sodium, potassium, calcium, lithium and iron silicates, having flat, six-sided monoclinic crystals, low hardness and perfect or near perfect basal cleavage. Typically they have a high degree of flexibility, elasticity and toughness and have laminae of the order of 10 angstroms in thickness which under mild shear can be delaminated or exfoliated. Typical examples include the principle mica-types of the general formula $$W_2(X,Y)_{4\text{-}6}Z_8O_{20}(OH,F)_4$$

where W is usually potassium; X, Y are aluminum, magnesium, iron or lithium and Z is silicon or aluminum and include muscovite, phlogopite, biotite, and lepidolite. Other materials falling within the general designation of MTS include montmorillonite, bentonite, hectorite, vermiculite and saponite. Commercially available materials include montmorillonite, bentonite and hectorite which are available from Southern Clay Products, Gonzales, Texas. The term intercalated and the phrase intercalated phenomenon shall refer to the insertion of polymer chains among the individual layers of the mica-type layered silicates. The term nanocomposite is intended to define a delaminated or exfoliated mica-type layered silicate which has a silicone elastomer inserted into, between, and among several layers of the layered silicate, wherein each layer of the mica-type layered silicate has a thickness on a nanometer ($10^{-9}$ meter) scale. The term aspect ratio shall refer to the ratio of the length to thickness of the mica-type layer silicates and the term high aspect ratio shall define a large dimensional ratio of the MTS.

Figure 1:
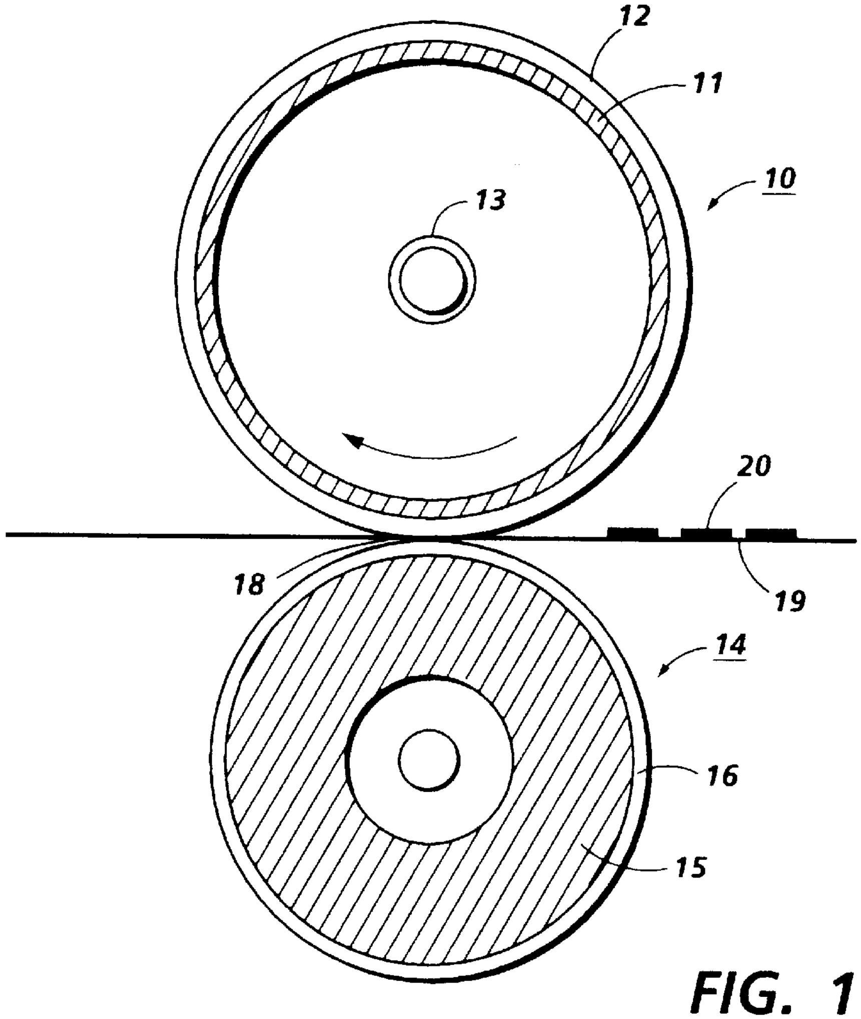
FIGS. 1 and 2 are sectional views of a dry roll fuser system which may use an embodiment of the present invention.

Turning now to FIG. 1, this figure shows a fuser roll for use in the present invention. Although the fuser member shown in FIG. 1 is in the form of a roll, it is to be understood that the present invention is applicable to fuser members of other shapes, such as plates or belts. In FIG. 1, the fuser roll 10 is composed of a core 11 having coated thereon a thin layer 12 of the elastomer according to the present invention. The core 11 may be made of various metals such as iron, aluminum, nickel, stainless steel, etc., and various synthetic resins. Aluminum is preferred for the core 11, although it is not critical. The core 11 is hollow and the heating element 13 is generally positioned inside the hollow core to supply the heat for the fusing operation. Heating elements suitable for this purpose are known in the prior art and may comprise a quartz heater made of a quartz envelope having a tungsten resistance heating element disposed internally therein. The method of providing the necessary heat is not critical to the present invention, and the fuser member can be heated by internal means, external means or a combination of both. All heating means are well known in the art for providing sufficient heat to fuse the toner to the support. The composition of layer 12 will be described in detail below.

The fuser roll 10 is shown in a pressure contact arrangement with a backup or pressure roll 14 which comprises a metal core 15 with a layer 16 of a heat-resistant material. In this assembly, both the fuser roll 10 and the pressure roll 14 are mounted on shafts which are biased so that the fuser roll 10 and pressure roll 14 are pressed against each other under sufficient pressure to form a nip 18. It is in this nip that the fusing or fixing action takes place. It has been found that the quality of the copies produced by the fuser assembly is better when the nip is formed by a relatively hard and unyielding layer 16 with a relatively flexible layer 12. In this manner, the nip is formed by a slight deformation in the layer 12 due to the biasing of fuser roll 10 on the pressure roll 14. The layer 16 may be made of any of the well known materials such as polytetrafluoroethylene, polyfluoroalkoxy resin, fluorinated ethylene-propylene copolymer or silicone rubber.

A sheet of support material 19 such as paper bearing thereon toner image 20 passes between the fuser roll 10 and the pressure roll 14 and the toner image thereon is fused.

Figure 2:
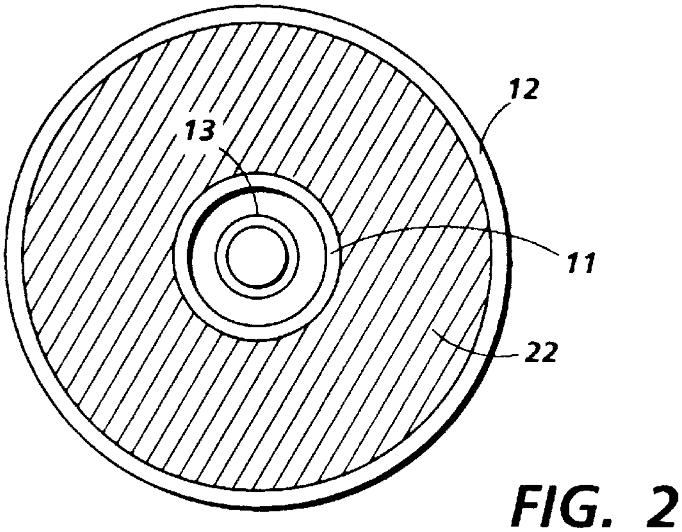

FIG. 2 illustrates an alternative embodiment wherein intermediate the thin layer 12 and the supporting core 11 is a thicker intermediate high temperature resistant elastomeric layer 22 which may be of any suitable material such as the silicone elastomer of the present invention.

The mica-type layered silicate may be present in an amount ranging for example from about 1% to about 50% by weight, preferably from about 5% to about 20% by weight, more preferably up to about 10% by weight, and especially from about 5% to about 10% by weight, based on the weight of the elastomer composition. The silicone elastomers used in accordance with the present invention are typically polyorganosiloxanes and include fluoro and vinyl substituted polyorganosiloxanes.

A preferred group of elastomers include the curable silicone elastomers such as the commercially available condensation curable and addition curable materials. The typical curable polyorganosiloxanes are represented by the formula:

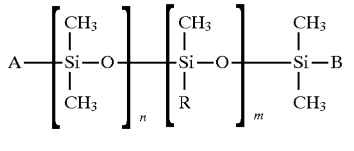

wherein R is hydrogen or substituted or unsubstituted alkyl, alkenyl or aryl having less than 19 carbon atoms, each of A and B may be any of methyl, hydroxy or vinyl groups and $$0<m/n<1 \text{ and } m+n>350.$$

The condensation curable polyorganosiloxanes are typically silanol terminated polydimethylsiloxanes such as:

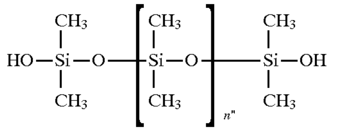

where n" is 350 to 2700. The terminating silanol groups render the materials susceptible to condensation under acid or mild basic conditions and are produced by kinetically controlled hydrolysis of chlorosilanes. Room temperature vulcanizable (RTV's) systems are formulated from these silanol terminated polymers with a molecular weight of 26,000 to 200,000 and they may be crosslinked with small quantities of multifunctional silanes which condense with the silanol group. Crosslinking agents which are suitable for purposes of the present invention include esters of orthosilicic acid, esters of polysilic acid and alkyl trialkoxy silanes. Specific examples of suitable crosslinking agents for the condensation cured materials include tetramethylorthosilicate, tetraethylorthosilicate, 2-methyoxyethylsilicate, tetrahydrofurfurylsilicate, ethylpolysilicate and butylpolysilicate, etc. During the crosslinking reaction, an alcohol is typically split out leading to a crosslinked network. We particularly prefer to use condensed tetraethylorthosilicate as a crosslinking agent in the composition of the invention. The amount of the crosslinking agent employed is not critical as long as a sufficient amount is used to completely crosslink the active end groups on the disilanol polymer. In this respect, the amount of crosslinking agent required depends on the number average molecular weight of the disilanol polymer employed. With higher average molecular weight polymers there are fewer active end groups present and thus a lesser amount of crosslinking agent is required and vice versa. Generally, with the preferred alpha omega hydroxy polydimethyl siloxane having a number average molecular weight of between about 26,000 to about 100,000 we have found that between 6 to 20 parts by weight of condensed tetraethylorthosilicate per 100 parts by weight of disilanol polymer to be suitable.

A particularly preferred embodiment of the present invention relates to a liquid addition cured polyorganosiloxanes achieved by using siloxanes containing vinyl groups at the chain ends and/or scattered randomly along the chain along with siloxanes having anything more than two silicon hydrogen bonds per molecule. Typically these materials are cured at temperatures of from about 100° C. to 250° C.

Typical materials are represented by the formula:

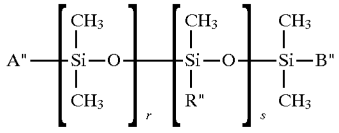

where A", B" and R" are methyl or vinyl provided the vinyl functionality is at least 2, and $$0<s/r<1, 350<r+s<2700.$$

By the phrase the functionality is at least 2 it is meant that in the formula for each molecule there must be at least a total of 2 vinyl groups in the A", B" and any of the several R" sites within the formula. In the presence of suitable catalysts such as solutions or complexes of chloroplatinic acid or other platinum compounds in alcohols, ethers or divinylsiloxanes reaction occurs with temperatures of 100° C. to 250° C. with the addition of polyfunctional silicon hydride to the unsaturated groups in the polysiloxane chain. Typical hydride crosslinkers are methylhydrodimethylsiloxane copolymers with about 15–70 percent methylhydrogen. Elastomers so produced exhibit increased toughness, tensile strength and dimensional stability. Typically, these materials comprise the addition of two separate parts of the formulation, part A containing the vinyl terminated polyorganosiloxane, the catalyst and the filler, part B containing the same or another vinyl terminated polyorganosiloxane, the crosslink moiety such as a hydride functional silane and the same or additional filler where part A and part B are normally in a ratio of one to one. During the additional curing operation the material is crosslinked via the equation $$\equiv SiH+CH_2=CHSi\equiv \rightarrow \equiv SiCH_2CH_2Si\equiv$$

and since hydrogen is added across the double bond no offensive byproduct such as acids or alcohols is obtained.

Accordingly and by way of example in the above formula for the polyorganosiloxane having substituents A, B, and R, typical substituted alkyl groups include alkoxy and substituted alkoxy, chloropropyl, trifluoropropyl, mercaptopropyl, carboxypropyl, aminopropyl and cyanopropyl. Typical substituted alkoxy substituents include glycidoxypropyl, and methacryloxypropyl. Typical alkenyl substituents include vinyl and propenyl, while substituted alkenyl include halogen substituted materials such as chlorovinyl and bromopropenyl. Typical aryl or substituted groups include phenyl and chlorophenyl. Hydrogen, hydroxy, ethoxy and vinyl are preferred because of superior crosslinkability. Methyl, trifluoropropyl and phenyl are preferred in providing superior solvent resistance, higher temperature stability and surface lubricity. The ratio of $$m/n$$

being between 0 and 1 identifies the polyorganosiloxane as a copolymer and the sum of m+n being greater than 350 identifies it as an elastomeric material.

The crosslinking agent used in the composition is for the purpose of obtaining a material with sufficient crosslink density to obtain maximum strength and fatigue resistance. The amount of crosslinking agent employed is not critical as long as the amount used is sufficient to sufficiently crosslink the active groups of the polymer used.

Crosslinking catalysts are well known in the art and include among others, stanneous octoate, dibutyltindilaurate, dibutyltindiacetate and dibutyltindicaproate for the condensation cured polyorganosiloxanes. The amount of catalysts employed is not critical, however, too small an amount of catalyst may lead to a very small reaction which is impractical. On the other hand, excessive amounts of catalysts may cause a breakdown of the crosslinked polymer network at high temperatures to yield a less crosslinked and weaker material, this adversely affecting the mechanical and thermal properties of the cured material.

As previously mentioned the mica-type layered silicate have laminae of the order of 10 angstroms in thickness. They also have a large length to thickness ratio because of the plate like structure which is referred to hereinafter as having a high aspect ratio. Typically the mica-type layered silicates have a maximum length on the order of 1 micrometer and an aspect ratio of length to thickness of from about 100 to about 1000. As a result the mica-type layered silicates when used as a filler to enhance the thermal conductivity or modulus of the silicone elastomer form a continuous touching path to conduct heat. Accordingly, the mica-type layered silicates are typically used in amounts up to about 10% by weight of the total weight of the elastomer composition to provide the desired thermal stability and swell resistance. In certain embodiments of the present invention, beyond about 10% by weight of the elastomer composition, additional amounts of the mica-type layered silicate may merely provide a filler effect without further enhancing the desired properties. While not wishing to be bound to any theory, it is believed that the sheets of the mica-type layered silicate provide antioxidant properties due to their large surface area which thermally stabilizes the area that surrounds it. Further and with regard to swell resistance, the mica-type layered silicates provide a large surface area barrier to the silicone release agent, thereby resulting in reduction of swelling of the silicone elastomer.

Figure 3:
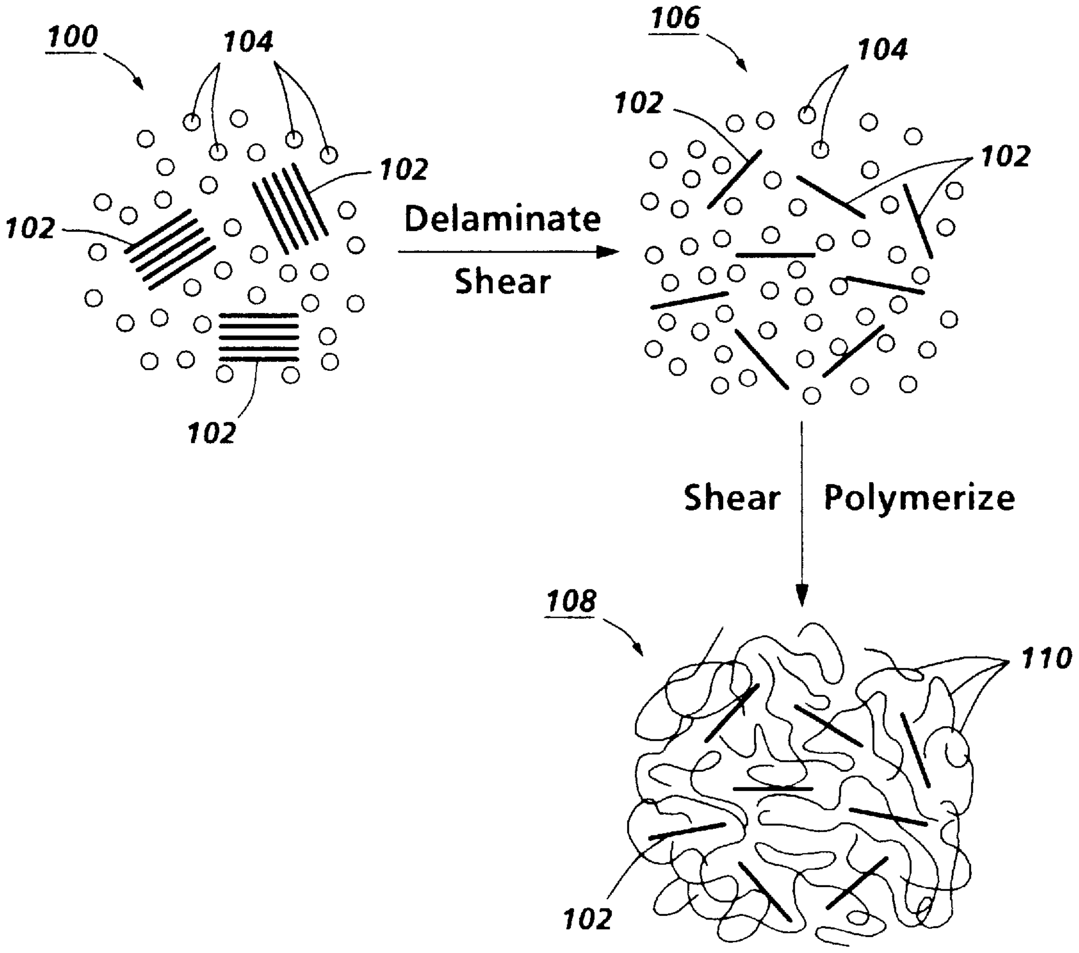
FIG. 3 is a simplified schematic illustration of the delaminated nanocomposite with silicone elastomer intercalated among the delaminated layers of the mica-type layered silicate together with the process steps to produce this structure.

Attention is directed now to FIG. 3 wherein the manufacture of thermally stable swell resistant elastomer compositions is schematically illustrated. In this schematic, the first area 100 illustrates the laminated mica-type layered silicates 102 in a polyorganosiloxane monomer 104 which when subjected to mechanical shear such as, for example, by simple stirring or mixing in a ball or pebble mill delaminates or exfoliates the layers of the mica-type layered silicate such that the polyorganosiloxane monomer 104 and individual layers of the mica-type layered silicate 102 are relatively uniformly mixed as illustrated in the second area 106 of the Figure. Upon the addition of suitable amounts of crosslinking agent and catalyst that are sufficient to crosslink the polyorganosiloxane to a silicone elastomer and following the desired shaping such as by dipping or spraying onto a substrate surface such as a roll or by molding in the form of a roll and curing the shaped silicone elastomer composition to provide a silicone elastomer filled with a mica-type layered silicate a delaminated nanocomposite is formed and is illustrated in the third area 108 of the FIG. 3 with silicone elastomer 110 inserted among the delaminated layers of the mica-type layered silicate 102. The intercalated phenomenon starts with surface treating the MTS with long chain alkylamines or amino acids such as dodecylamine or dodecylamino acid to give the MTS an organophilic nature. This will then enhance the wetting of the MTS by silicone materials. On mixing the surface treated MTS with silicone, the silicone penetrates the MTS lamellae causing each lamella to be surrounded by silicone as the MTS exfoliates.

Figure 5:
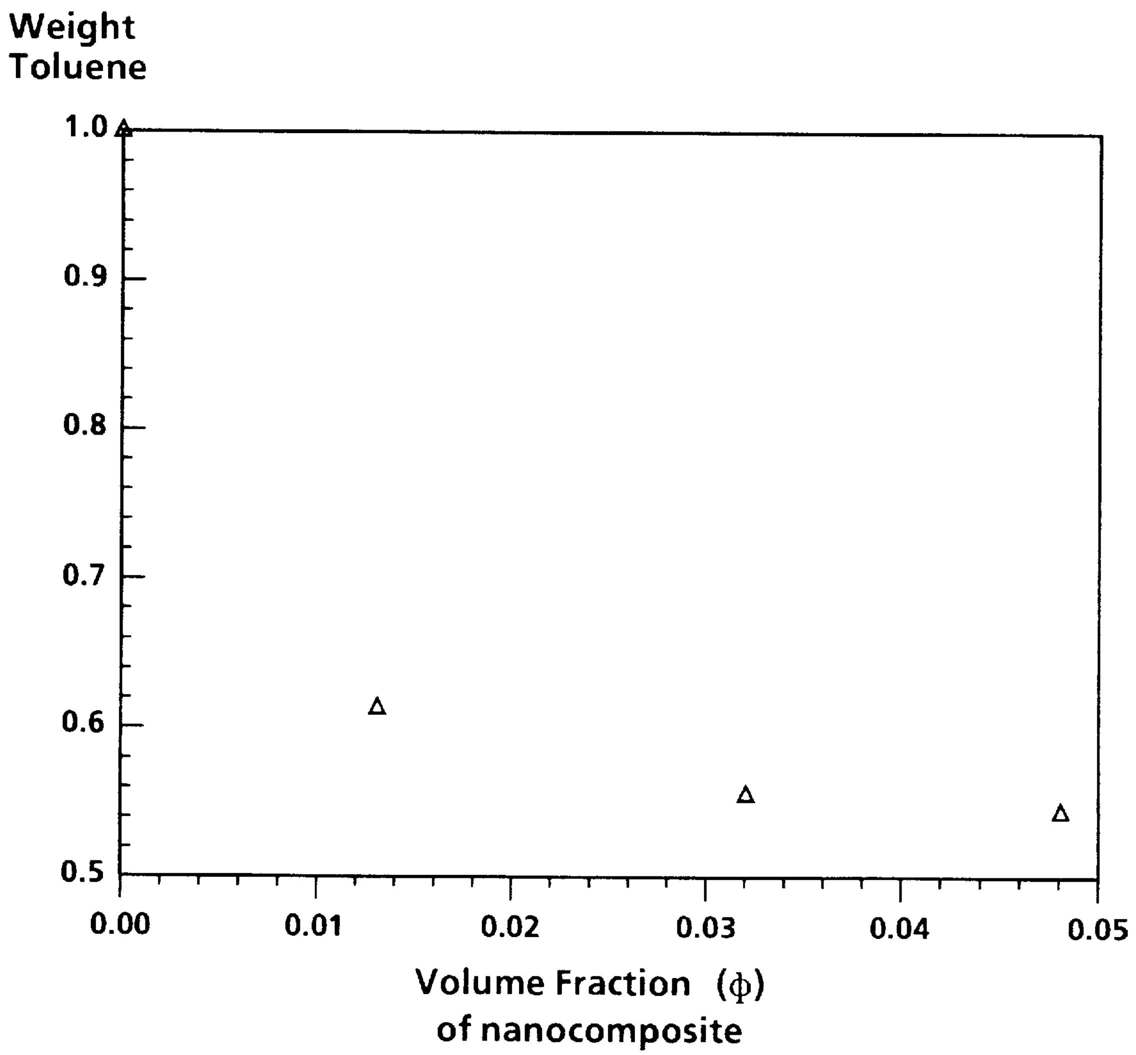
FIG. 5 is a graphical representation of the reduction in mass uptake as expressed as weight of toluene uptake in the illustrated volume fractions of the delaminated nanocomposite in toluene.

With respect to the alternative embodiment wherein the silicone elastomer composition forms a fusing surface, experiments to conduct swelling evaluations of the silicone elastomer compositions according to the present invention have shown that the presence of only 5% by weight in the elastomer composition of the mica-type layered silicates, when made into a silicone elastomer according to the present invention and subjected to swelling in the presence of polydimethylsiloxane oil, resulted in a reduction in swelling of 50%. That is, the amount of swell was reduced by one-half with the presence of only 5% by weight of the mica-type layered silicate over that which would have been obtained without any mica-type layered silicate. As discussed in more detail later, FIG. 5 illustrates the swelling due to toluene in a silicone composition containing the stated volume fractions of the mica-type layered silicate. Since the ordinate axis represents the ratio of volume swell of silicone with MTS added to the volume swell of the silicone with no MTS added, there are no units and 1.0 represents the volume swell with no MTS added.

Other additives or agents may be incorporated in the elastomeric composition in accordance with the present invention as long as they do not affect the integrity of the elastomer. Such agents include coloring agents, processing aids, accelerators and polymerization initiators which may be used in addition to the crosslinking agents and catalysts referred to above. MTS alone or in combination with low hardness fillers may be dispersed in the elastomer material in any suitable or convenient form or manner. It is preferably uniformly dispersed in the elastomer during compounding. For example, when the elastomer is in the form of a gum, the MTS and other filler may be milled into the gum prior to curing to form the elastomer. In general, the MTS and any filler are dispersed in the elastomer by mixing with the elastomer gum or other millable form of the elastomer compound preferably prior to solution or homogenization before application to the base member. The MTS and other filler present may be dispersed in the elastomer by conventional methods known to those skilled in the art. For example in a pebble mill, the MTS and elastomer may be compounded during which the MTS may be reduced in particle size. The compounding, however, should not be carried out to such a degree or level extent that the MTS loses its general leaf structure.

The fuser member may then be prepared by applying the elastomer having the MTS and any filler dispersed therein directly to the base member in one application or by successively applying layers of the elastomer composition to the base member. The coating is most conveniently carried out by spraying or dipping in a light solution of homogeneous suspension containing the MTS. Molding, extruding and wrapping are also alternative techniques which may be used to make the fuser members. Typically, an elastomeric surface fusing layer is from about 1.0 mm to about 100 mils thick. In the alternative embodiment when the elastomer composition is used as an intermediate layer it is from about 50 mils to about 100 mils in thickness. In a particularly preferred embodiment, the silicone elastomer is an intermediate layer with a toner fusing surface layer of an FKM hydrofluoroelastomer from about 1 to about 5 mils in thickness. When the desired thickness of elastomer compound is coated onto the base or substrate member, the elastomer composition is cured and thereby fused to the base member.

The FKM hydrofluoroelastomers, according to the present invention, are those defined in ASTM designation D1418-90 and are directed to fluororubbers of the polymethylene type having substituent fluoro and perfluoroalkyl or perfluoroalkoxy groups on a polymer chain.

The fluoroelastomers useful in the practice of the present invention are those described in detail in U.S. Pat. No. 4,257,699 to Lentz, as well as those described in commonly assigned U.S. Pat. Nos. 5,017,432 to Eddy et al. and 5,061,965 to Finsterwalder et al. As described therein, these fluoroelastomers, particularly from the class of copolymers and terpolymers of vinylidenefluoride hexafluoropropylene and tetrafluoroethylene, known commercially under various designations as Viton A, Viton E60C, Viton E430, Viton 910, Viton GH and Viton GF, are suitable in the practice of the present invention. The Viton designation is a Trademark of E. I. DuPont deNemours, Inc. Other commercially available materials include Fluorel 2170, Fluorel 2174, Fluorel 2176, Fluorel 2177 and Fluorel LVS 76, Fluorel being a Trademark of 3M Company. Additional commercially available materials include Aflas a poly(propylenetetrafluoroethylene) copolymer, Fluorel II a poly(propylenetetrafluoroethylene-vinylidenefluoride) terpolymer both also available from 3M Company. Also, the Tecnoflons identified as FOR-60KIR, FOR-LHF, NM, FOR-THF, FOR-TFS, TH, TN505 are available from Ausimont Chemical Company. Typically, these fluoroelastomers can be cured with a nucleophilic addition curing system, such as a bisphenol crosslinking agent with an organophosphonium salt accelerator as described in further detail in the above referenced Lentz Patent, and in U.S. Pat. No. 5,017,432 to Eddy et al. or with a peroxide as described in DuPont's literature.

In the Examples below, unless otherwise specified, all parts and percentages are by weight.

EXAMPLE 1

Figure 4:
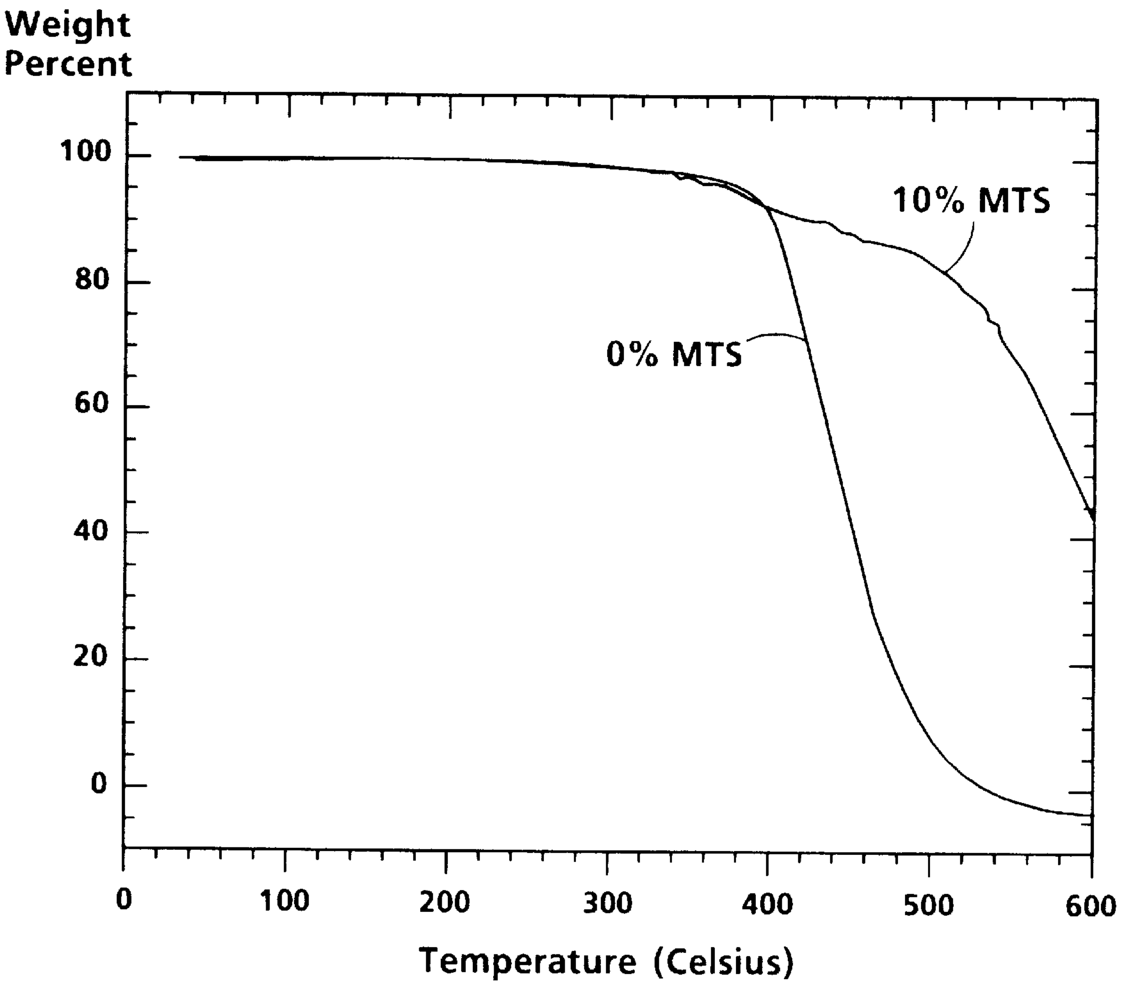
FIG. 4 is a graphical illustration of thermal stability indicating the weight percent loss of a silicone elastomer at various temperatures up to 600° Centigrade with zero and 10% by weight of the mica-type layered silicate.

With reference to FIG. 4, the thermal stability of a silicone elastomer was evaluated containing 0% and 10% by weight of the elastomer composition of a mica-type layered silicate. The two samples were prepared as follows: to 100 parts of a 750 centipoise alpha, omega-dihydroxysilicone obtained from United Chemical Technologies, Inc. and designated as PS342.5, 2.5 parts of tetraethoxysilane crosslinker obtained from Aldrich Chemical Company and 2 parts of Tin(II) ethylhexanoate catalyst obtained from Chemat and designated as T722 were added. The three ingredients were well mixed using a micro-tip Ultrasound probe available from Sonics & Materials. One sample, with 0% MTS, was poured into a 2 cm×2 cm×0.5 cm Teflon mold and cured for 12hours at room temperature and atmospheric pressure. Another sample had 10 parts of montmorillonite (surface treated with an amine surfactant) mixed into the 104.5 parts of dihydroxysilicone-crosslinker-catalyst material via the microtip Ultrasound probe. This latter sample was then poured into a Teflon mold of dimensions similar to the one above and also cured for 12 hours at room temperature and atmospheric pressure. This graphical representation of FIG. 4 illustrates the weight percent loss of water and formaldehyde at various temperatures for the silicone elastomer composition. As may be observed by the addition of a small amount, 10% by weight of the mica-type layered silicate based on the weight of the elastomer composition, a rather greatly improved thermally stable silicone elastomer composition was achieved and in particular has a greatly improved thermal stability over the range of 400°–500° C. where at the same temperature range the weight of the silicone elastomer composition without any mica-type layered silicate dropped from 100% to almost 0%. The ordinate axis represented how much of the original weight of silicone compound was still present after heating to the progressively higher temperatures. Starting at room temperature, the samples were heated at a rate of 10° C. per minute.

It is believed that the improvement in thermal stability is particularly effective in those applications wherein the silicone elastomer composition is used as an intermediate in a fuser member composition between the fuser member substrate and the actual fusing surface.

EXAMPLE 2

The three MTS incorporated silicone specimens were formulated in the following manner: to 100 parts of a 750 centipoise alpha, omega-dihydroxysilicone obtained from United Chemical Technologies, Inc. and designated as PS342.5, 2.5 parts of tetraethoxysilane crosslinker obtained from Aldrich Chemical Company and 2 parts of Tin(II) ethylhexanoate catalyst obtained from Chemat and designated as T722 were added. The three ingredients were well mixed using a micro-tip Ultrasound probe available from Sonics & Materials and the montmorillonite (surface treated with an amine surfactant) was also added and mixed into the dihydroxysilicone-crosslinker-catalyst mixture using the micro-tip Ultrasound probe. The specimens utilized for the toluene swell experiments were made using samples ranging from 3 to 10 weight percent of surface treated montmorillonite (3 to 10 parts per hundred of the PS342.5). The crosslinked samples were made by pouring the various mixtures into open 2 cm×2 cm×0.5 cm Teflon molds and curing of the material occurred at room temperature and atmospheric pressure for 12 hours. The first point in FIG. 5 at about 0.013 volume fraction of nanocomposite represented 3 parts of the surface treated montmorillonite per hundred parts of the 750 centipoise dihydroxysilicone and tetraethoxysilane mixture. At this 3 part per hundred level of surface treated montmorillonite the volume swell of the silicone network in toluene dropped by about 38%. The next points at 0.032 and 0.048 represented 5 and 10 part per hundred levels of surface treated montmorillonite. As can be seen from FIG. 5 the additional loadings of the surface treated montmorillonite reduced the volume swell of the silicone network still further to about 55% of the swell in toluene obtained for the silicone network without any added montmorillonite. The reduction in toluene swell is important because it indicates to what degree the silicone and montmorillonite compound swell in the commonly used toner release agent, silicone oil, will be reduced. Since swelling of an elastomer network such as silicone greatly reduces its physical strength and thus its functional life, a reduction of the amount of swelling increases its physical strength and extends its useful life.

Thus, according to the present invention a thermally stable and swell resistant silicone elastomer composition has been provided. In addition to increased thermal stability and resistance to swell in oil, the addition of small amounts of mica-type layered silicate to a silicone elastomer composition provides a longer roll life, one which has a reduced failure mode due to hardness and one which is easy to fabricate since it merely requires stirring with mild shear. In addition, the relatively low amount of mica-type layered silicate material characterized as a filler enables an inexpensive material and method of manufacture.

While the invention has been described in detail with reference to specific and preferred embodiments, it will be appreciated that various modifications and variations will be apparent to the artisan. For example, while the invention has been described with reference to the formation of a fuser member in the configuration of a fuser roll, it will be equally well understood that it may be used in the configuration of a belt or a pad. In addition, while the fuser member has been illustrated as a fuser roll, it may in addition be employed as a pressure roll or a release agent donor roll. All such modifications and embodiments as may readily occur to one skilled in the art are intended to be within the scope of the appended claims.

We claim:

1. A fuser member for use in an electrostatographic printing machine comprising at least one layer of an elastomer composition including a silicone elastomer and a mica-type layered silicate, said silicone elastomer and mica-type layered silicate forming a delaminated nanocomposite wherein the fuser member defines a toner fusing surface, and wherein said at least one layer is a top layer having a thickness ranging from about 10 mils to about 100 mils or an intermediate layer between a base layer and a surface layer.

2. The fuser member of claim 1 wherein said mica-type layered silicate is present in an amount ranging from about 1% to about 50% by weight based on the weight of the elastomer composition.

3. The fuser member of claim 1 wherein said mica-type layered silicate is present in an amount ranging from about 5% to about 20% by weight based on the weight of the elastomer composition.

4. The fuser member of claim 1 wherein said mica-type layered silicate is present in an amount up to about 10% by weight based on the weight of the elastomer composition.

5. The fuser member of claim 1 wherein said mica-type layered silicate has an aspect ratio of length to thickness of from about 100 to about 1000.

6. The fuser member of claim 1 wherein said mica-type layered silicate has a particle size having a length of from about 1 micrometer to about 10 micrometers.

7. The fuser member of claim 1 wherein said silicone elastomer is a cured polyorganosiloxane having the formula

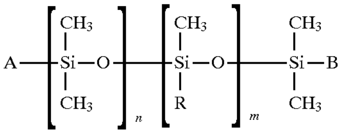

where R is hydrogen or substituted or unsubstituted alkyl, alkenyl or aryl having less than 19 carbon atoms, each of A and B may be any of methyl, hydroxy or vinyl groups and $0<m/n<1$ and $m+n>350$.

8. The fuser member of claim 1 wherein said mica-type layered silicate is selected from the group consisting of montmorillonite, bentonite, and hectorite.

9. The fuser member of claim 1 wherein said intermediate layer is from about 50 to about 100 mils in thickness.

10. The fuser member of claim 1 wherein said member is a cylindrical roll.

11. The fuser member of claim 10 wherein said roll is internally heated by a heating element disposed within its center.

12. The fuser member of claim 11 including a cylindrical support core having said heating element disposed within its center and the surface layer comprising a hydrofluoroelastomer and being from about 1 to about 5 mils in thickness.

* * * * *